(No Model.)
J. C. CHAPMAN.
RECIPROCATING MECHANICAL MOVEMENT.
No. 275,144.  Patented Apr. 3, 1883.
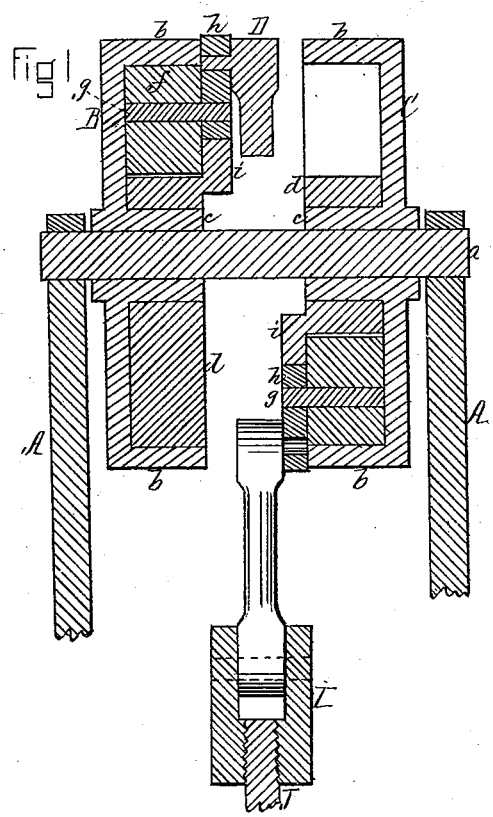
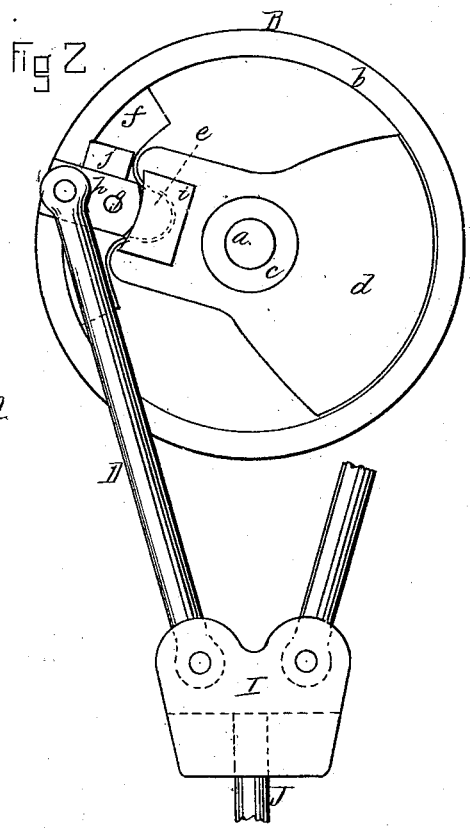
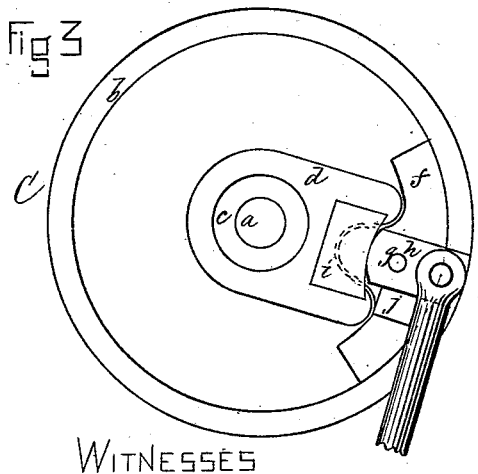
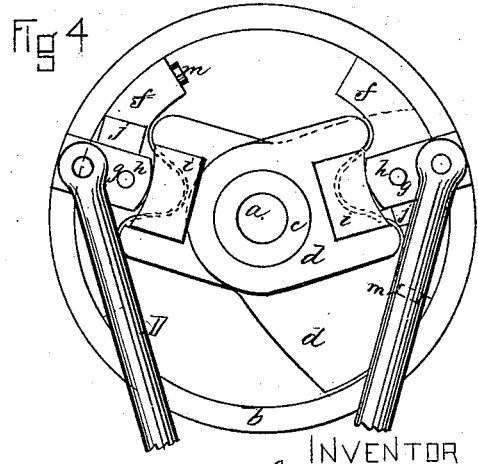
WITNESSES
W. Hambridge
C. H. Cobb.
INVENTOR
John C. Chapman

United States Patent Office.

JOHN C. CHAPMAN, OF BOSTON, MASSACHUSETTS.

RECIPROCATING MECHANICAL MOVEMENT.

SPECIFICATION forming part of Letters Patent No. 275,144, dated April 3, 1883.

Application filed September 27, 1882. (No model.)

*To all whom it may concern:*

Be it known that I, JOHN C. CHAPMAN, of Boston, in the county of Suffolk and State of Massachusetts, have invented an Improvement in Reciprocating Mechanical Movements, of which the following is a full, clear, and exact description, reference being had to the accompanying drawings, forming part of this specification, in which—

Figure 1 is a vertical section through my improved movement. Fig. 2 is an elevation of one of the wheels and mechanism connected therewith. Fig. 3 is a similar elevation of the other wheel. Fig. 4 represents a modification of my invention.

In the drawings, A represents a frame or standard, within bearings in which is supported the shaft a. Upon this shaft is fixed a pair of pulleys or wheels, B C, which are rotated alternately by mechanism to be presently described. Both of the pulleys B C are provided with a flange or rim, b, which project toward each other, as seen in Fig. 1. Within the flange or rim of the pulley B, and encircling the hub c thereof, is placed a piece, d, of the form seen in Fig. 2, one end of which is enlarged and acts as a weight, fitting loosely within the rim b of the wheel B, the opposite end being bifurcated. Within this bifurcated end of the piece d is loosely fitted a projection, e, extending inward from a piece, f, of the form shown in Fig. 2. The outer periphery of this piece f bears against the inner periphery of the flange b of the wheel B. Pivoted upon this piece f, by means of a pin, g, is a short arm or lever, h, the outer end of this lever being provided with a pin or projection, over which fits the upper end of a lever or connecting-rod, D, the lower end of which is connected with a cross-head, I, which is attached to the piston-rod J of an engine, or to a treadle or any other motive power. The inner end of the arm or lever h, which is curved or rounded, bears against a block or projection, i, made in one and the same piece with the piece d, the outer end of this block being curved, as shown; or it may be made of wedge form, if desired. Upon the piece f is secured a projection or stop, j, against which the lever h strikes. The opposite pulley or wheel, C, is similarly constructed to that of the wheel B, except that the piece d is not provided with a weighted end. In all other respects the parts are constructed exactly alike, except that the projection or stop j in this instance is placed below the short arm or lever h, while in the case of the wheel B it is placed above the short arm h.

In Fig. 4 is shown a modification of my invention, in which all the parts shown in Figs. 2 and 3 are placed within the rim of a single wheel, and operate in the same manner as if placed in separate wheels, and, if desired, rubber or other springs or bunters, m, may be employed at the ends of the pieces f to cushion the blow when they strike together, and relieve each other of the friction upon the rim of the wheel before the completion of the stroke.

The operation of my invention is as follows: When power is applied to the piston-rod J it is communicated by the connecting-rods D to the wheel C by means of the short arm h, whose inner end being wedge shape or eccentric, binds against the block i, attached to the piece d, and forces the piece or segment f out against the inner periphery of the rim b of the wheel, and at the same time forces the piece d against the hub c of the wheel or against the shaft, thus causing the wheel to revolve in the required direction. When, however, it is desired to move the piston in the opposite direction, the other wheel, B, revolving in the same direction, is brought into use in the same manner as that described for the wheel C at the instant that the piston has arrived at the end of its stroke, the wedge-shape or eccentric arm h being assisted by the weighted end of the piece d. When either of the arms h have arrived at the end of the stroke they strike against the stops j, which releases or slacks the bite or grip. Thus while the grip is upon one wheel pulling in one direction the grip in the other is released, though both connecting-rods move together in the same direction.

What I claim as my invention is as follows:

1. The piece d, provided with the projection i, in combination with the segment f, having the lever h pivoted thereto, for the purpose of rotating the pulley, substantially as set forth.

2. The segment $f$, having a stop, $j$, in combination with the lever $h$, with its wedge-shaped end and the projection $i$ on the piece $d$ for the purpose of releasing the grip on the rim of the pulley, as described.

3. The piece $d$, having its outer end enlarged or weighted, in combination with the projection $i$, segment $f$, lever $h$, and means for actuating the same, all substantially as described.

JOHN C. CHAPMAN.

Witnesses:
W. J. CAMBRIDGE,
C. H. COBB.